Sept. 2, 1941.  H. RÜHLE ET AL  2,254,548
METHOD AND MEANS FOR TESTING THE ADJUSTMENT OF PHOTOGRAPHIC OBJECTIVES
Filed Dec. 18, 1939  2 Sheets-Sheet 1
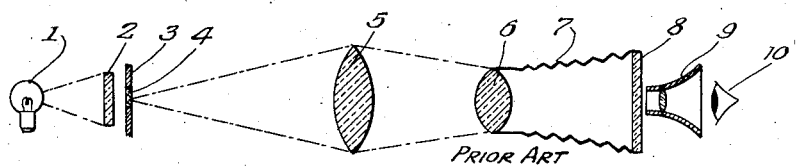
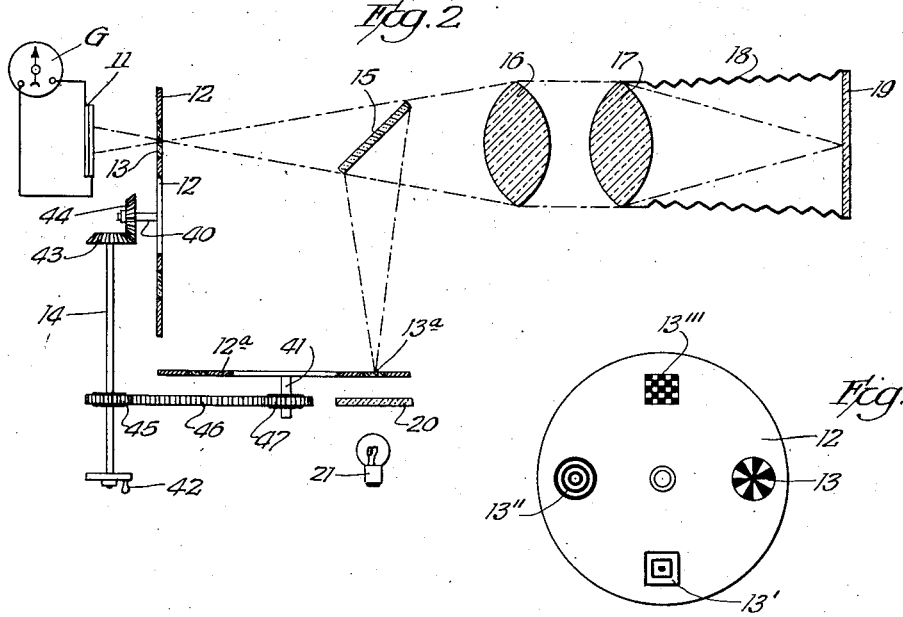
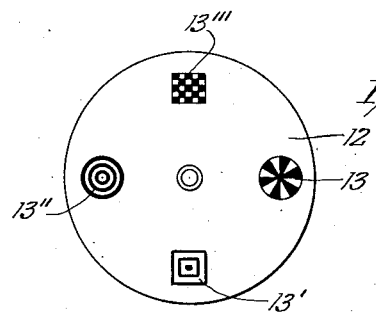
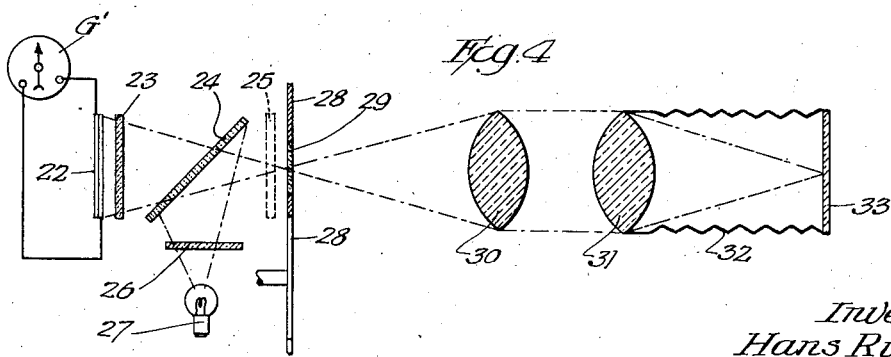
Inventors
Hans Rühle
Alfred Roell
BY:
Singer, Ehlert, Stern & Carlberg
Attys:

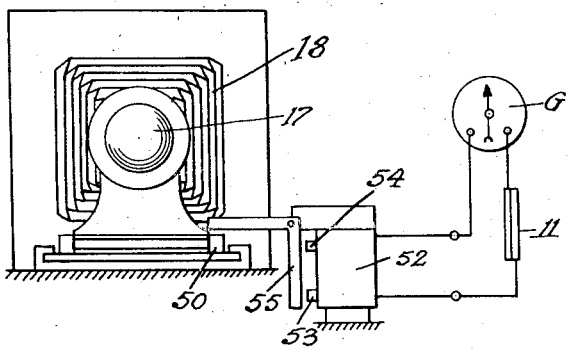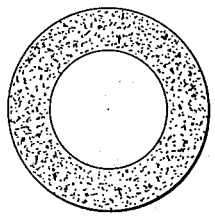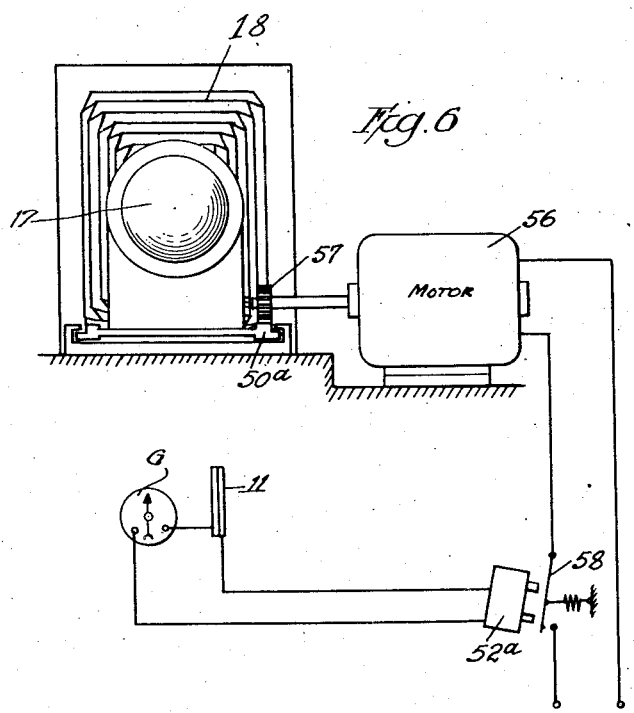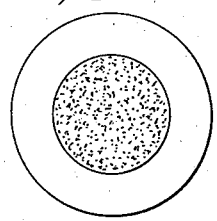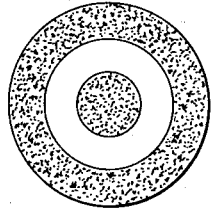

Patented Sept. 2, 1941

2,254,548

UNITED STATES PATENT OFFICE 2,254,548

METHOD AND MEANS FOR TESTING THE ADJUSTMENT OF PHOTOGRAPHIC OBJECTIVES

Hans Rühle, Dresden-Striesen, and Alfred Roell, Dresden-Zschachwitz, Germany, assignors to Zeiss Ikon Aktiengesellschaft, Dresden, Germany Application December 18, 1939, Serial No. 309,902
In Germany November 28, 1938

8 Claims. (Cl. 88—56)

The invention relates to a method and means for testing the adjustment of lenses, particularly photographic objectives.

For various technical and scientific purposes it is desirable to adjust lenses, particularly photographic objectives, with respect to a fixed plane, as a light sensitive film or a projection screen, in such manner that an object positioned at infinity or very near is reproduced sharply in said fixed plane, customarily called picture plane. Particularly, in the mass production of photographic cameras it has been considered necessary to be able to test quickly the accuracy of the adjustment of photographic objectives when focused at an object at infinity.

According to methods employed heretofore, a contrastive pattern, as a grid, a geometrical design or the like, mounted in the focal plane of a collimator is illuminated by a source of light, and an image of this pattern is projected through the objective of the camera to be tested onto a ground glass plate and is examined by the operator with a magnifying lens.

The adjustment of the image to its maximum sharpness takes place by the hand of the operator who at the same time examines continuously the image on the ground glass plate. It is apparent, that this method does not permit a quick working so desirable in the mass production of photographic cameras, the more so as the required visual examination of the image of the test pattern puts severe strains upon the eye of the operator and tires the same and often makes a repeated adjustment of the image necessary. The accuracy of the adjustment is apt to decline with the number of examinations made and the longer the work is continued. It is also obvious, that the accuracy is dependent upon the attention and conscientiousness of the operator.

In order to eliminate the observation of an image on a ground glass plate, which observation is a strain on the eyes and very tiring, it has been proposed already to employ an autocollimator for testing photographic objectives, since by a suitable selection of the focal length it is possible to obtain a far greater sensitiveness of adjustment as it can be obtained by examining an image on a ground glass plate. But even in this case the accuracy of the examination is dependent upon the reliability of the human eye.

It is an object of the present invention to overcome the disadvantages of the methods of the prior art employed for examing the adjustment of lenses, particularly photographic objectives. According to the present invention the objectives are examined by autocollimation in which the adjustment of the objectives to their maximum sharpness is controlled photoelectrically.

Another object of the invention is to control the photoelectric device used in the method for examining a photographic objective by the light which passes through a test pattern arranged in the path of light of the collimator telescope.

Still another object of the invention is to employ the electric current in the circuit of the photoelectric cell forming a part of the examining systems for operating a gearing or other mechanism which is adapted to automatically adjust the objective to its maximum sharpness.

The photoelectric device employed in the present invention eliminates any errors which may occur in the methods heretofore employed and in which the sharpness of the image of the test pattern is examined by visional observation. According to the invention photographic objectives may now be examined by unskilled operators, since the accurate operation of the photoelectric device, which performs the control, eliminates any errors from the beginning.

In a preferred embodiment of the invention a test pattern is illuminated by a source of light and an image of this test pattern is projected upon a screen which is reflective by means of an autocollimator telescope and the objective to be examined. The image on said reflective screen is reflected back through said objective and said autocollimator telescope and through a ray dividing means is focused upon a second test pattern. The light passing through the second test pattern is directed onto a photoelectric cell, in the circuit of which is arranged a measuring instrument which measures the electric current in the photoelectric cell circuit and so indicates the degree of adjustment of the photographic objective under examination.

In the drawings:

Fig. 1 discloses diagrammatically a device for examining lenses as used heretofore, Fig. 2 discloses diagrammatically the preferred embodiment of a device for examining lenses according to the present invention.

Fig. 3 is a plan view of a disc-shaped member carrying a number of different test patterns, and Fig. 4 illustrates diagrammatically a modified embodiment of the present invention.

Figs. 5 and 6 illustrate each diagrammatically an objective adjusting device controlled by the photocell current which energizes a solenoid and the Figs. 7, 8 and 9 illustrate each a different diaphragm member used for examining different zones of an objective.

According to Fig. 1, which illustrates a test arrangement of the prior art, the source of light 1 illuminates through a ground glass plate 2 a test pattern 4 arranged on a suitable carrier 3. The test pattern 4 is arranged in the focal plane of a collimator objective 5. An image of the test pattern 4 is projected by the collimator objective 5 and the objective 6 to be examined onto the ground glass plate 8. The adjustment of the image to its maximum sharpness may be accomplished for instance by a variation of the extension of the bellows 7, which adjustment is made by the operator whose eye 10 examines the image on the ground glass plate 8 by means of a magnifying lens 9. A system of this type heretofore has been used extensively for examining objectives for photographic cameras.

Referring to Fig. 2, which discloses a system of the present invention, a source of light 21 illuminates through a ground glass plate 20 or a condenser a test pattern 13ª on a plate 12ª. An image of the test pattern 13ª is reflected by means of a semi-transparent plate 15 into the objective 16 of an autocollimator telescope and the lens 17 to be examined and is projected onto a reflective surface 19. The lens 17 may consist of the objective of a photographic camera. The image appearing on the surface 19 is reflected by the latter back into the objective 17 and through the autocollimator telescope objective 16 and the semi-transparent mirror plate 15 onto a second test pattern 13 on a second plate 12 which is arranged in the picture plane of the collimator telescope. In rear of the second test pattern 12 is mounted a photo electric cell 11, which also may be mounted in rear of an ocular. Since both test patterns 13 and 13ª are of the same size and form, the image of the latter will be in accurate register with the pattern 13 in the plane of the plate 12 when the objective 17 is correctly adjusted. Under this condition the amount of light passing through the pattern 13 will be a maximum, which will be indicated by the measuring instrument G or other indicating device in the circuit of the photo electric cell 11.

It is also possible to employ one test pattern which is a negative of the other, so that upon a correct adjustment of the objective 17 the amount of light passing to the photoelectric cell 11 will be a minimum.

In order to control the adjustment, the operator of the examining device is only required to vary the extension of the bellows 18, which supports at its front end the objective 17 to be examined. The adjustment of the bellows 18 is continued until the measuring instrument G in the photo cell circuit indicates a maximum current or a minimum current, depending upon what type of test patterns are used. For the initial adjustment of the entire arrangement the reflective surface 19 may be substituted by a ground glass plate and the image appearing thereon may be examined visually in known manner.

According to the light density and the corrective condition of the lens, or the reflective property of the surface 19, or the color of the light source 21, different forms and shapes of the test pattern may be used for best results.

Therefore, the present invention employs two identical series of test patterns, arranged on the discs 12 and 12ª respectively. Fig. 3 illustrates the disc 12 provided with a series of four different test patterns 13, 13', 13'' and 13'''. Both discs 12 and 12ª are rotatably mounted about shafts 40 and 41 respectively at a right angle to each other and adapted to be rotated simultaneously by a shaft 14 provided with a manually operable crank 42. The shaft 14 is operatively connected with the disc 12 by a bevel gearing 43, 44 and with the disc 12ª by a sprocket chain transmission 45, 46, 47 as is illustrated in Fig. 2. Obviously, any other means may be provided for rotating the two discs 12 and 12ª in a manner that always two similar test patterns are in cooperative relation, one in the path of the source of light 21 and the other in front of the photoelectric cell 11.

Fig. 4 illustrates a somewhat simpler embodiment of the invention, in that only one test pattern 29 is used, instead of a pair as in the embodiment of Fig. 2. The single test pattern 29 is mounted on a plate 28 which is similarly constructed as the disc 12 (Fig. 3) and also has a series of different test patterns thereon. The test pattern 29 is arranged between the axially alined photoelectric cell 22 and the objective 30 of the autocollimator telescope, and in the picture plane of the latter. A source of light 27 illuminates through a ground glass plate 26 the test pattern 29 by means of an inclined semi-transparent mirror 24 arranged in rear of the plate 28. An image of the test pattern 29 is projected by means of the collimator objective 30 and the objective 31 to be examined upon the reflective surface 33. The adjustment of the objective 31 along its optical axis may take place in any desired manner, for instance by varying the extension of the bellows 32. The light rays reflected from the surface 33 pass a second time through the objective 31 and the collimator objective 30 and after passing through the semi-transparent mirror 24 strike the photoelectric cell 22. When the objective 31 is correctly adjusted the image of the test pattern reflected from the surface 33 will be in register with the original test pattern 29 on the plate 28 and the amount of light energizing the photoelectric cell will be a maximum. It therefore is only necessary to adjust the objective 31 until the measuring instrument G' indicates a maximum electric current.

The adjustment of the objectives 17 and 31 may be controlled directly by the electric current produced by the photoelectric cell 11 and 22 respectively, by means of a suitable transmission 50ª, 57 (Fig. 6) operated for instance by an adjustable motor 56, the circuit of which is controlled by a switch 58 which is opened by a solenoid 52ª energized by the photocell current when the latter reaches a predetermined value or an escapement energized by the photocell current. A simple semi-automatic control may be employed when the slide 50 (Fig. 5) which adjusts the objective 17 or 31 along its optical axis, or a rotatable objective adjusting ring, is arranged opposite the armature 55 of an electromagnet 52, 53, 54 energized by the photocell current, whereby upon a manual adjustment of the slide 50 or adjusting ring and upon the generation of a maximum current by the photoelectric cell the operator will feel a substantial drag on the slide or adjusting ring caused by the attractive force of the electromagnet and thus is able to determine whether the adjustment is correct.

According to the present invention the objectives 17 and 31 to be examined may also be covered by annular or circular diaphragm members illustrated in the Figs. 7, 8 and 9, so that it is possible to examine closely various and different zones of the individual objectives.

The reflective property of the image receiving surfaces 19 and 33 may be improved by constructing the same in the form of diffusedly reflecting flat faces, or as flat mirrors, or as lens screens.

In order to eliminate disturbing secondary phenomena as reflection on the surfaces of the objectives 16, 17 and 30, 31 respectively, it is advisable to mount light polarizing means 23 in front of the photoelectric cell 22 or in rear of the test pattern 29 as shown at 25.

It is also possible, in accordance with the present invention, to employ an intermittent source of light for illuminating the test pattern; so as to eliminate disturbances caused by diffused and reflected light rays. Furthermore, differently colored light (monochromatic light or mixed light) may be employed, if desired in combination with a periodic interruption of the light source, for examining the chromatic errors of the lenses.

What we claim is:

1. In a method for examining and controlling in photographic cameras the adjustment of the photographic lens, the steps of illuminating a test pattern arranged in the focal plane of a collimator, projecting an image of said test pattern through said collimator and the lens to be examined onto a fixed reflective surface arranged in the focal plane of the camera, which reflective surface reflects the image back through said lens and said collimator onto said test pattern, energizing a photo cell with the light of the reflected image passing through said test pattern, measuring the electric current produced by the energization of said photo cell and adjusting said lens along its optical axis with respect to said reflective surface until the electric current produced by said photo cell reaches a maximum value.

2. In a method for examining and controlling in photographic cameras the adjustment of the photographic lens, the steps of projecting the image of a test pattern by means of a collimator and the lens to be examined onto a fixed reflective surface arranged in the focal plane of the camera which reflective surface reflects the image in the opposite direction it was projected onto a test pattern of the same size and form as the test pattern from which said image was produced, energizing a photo cell with the light of the reflected image passing through said test pattern, measuring the electric current produced by the energization of said photo cell, and adjusting said lens along its optical axis with respect to said fixed reflective surface until the electron current produced by said photo cell reaches a maximum value.

3. A device for examining and controlling the adjustment of lenses, particularly photographic objectives, including an autocollimator telescope having an objective mounted in axial alinement with the lens to be examined, a reflective surface mounted in a plane in rear of said lens, means for adjusting said lens along its optical axis with respect to said reflective surface, a test pattern in the focal plane of said telescope objective, means for deflecting a beam of light onto said test pattern so as to produce an illuminated image of the same in the path of the light rays of said telescope objective, whereby the latter in combination with said lens to be examined projects said image onto said reflective surface, said reflective surface being adapted to reflect said image back through said lens and said telescope objective onto said test pattern, a photo cell in the path of the reflected light rays which pass through said test pattern and adapted to be energized by the reflected light rays passing through said test pattern, and means for indicating the value of the electric current produced in said photo cell.

4. A device for examining and controlling the adjustment of lenses, particularly photographic objectives, including an autocollimator telescope having an objective mounted in axial alinement with the lens to be examined, a reflective surface mounted in a plane in rear of said lens, means for adjusting said lens along its optical axis with respect to said reflective surface, a test pattern in the focal plane of said telescope objective, means for illuminating said test pattern whereby a luminous image of the latter is produced on said reflective surface, said reflective surface being adapted to reflect said image back through said lens and said telescope objective onto said test pattern, a photo cell in spaced axial alinement with said test pattern and on the opposite side of which said telescope objective is arranged, said photo cell being adapted to be energized by light passing through said test pattern, and means for indicating the value of the electric current produced in said photo cell.

5. A device for examining and controlling the adjustment of lenses, particularly photographic objectives, including an autocollimator telescope having an objective mounted in axial alinement with the lens to be examined, a reflective surface mounted in a plane in rear of said lens, means for adjusting said lens along its optical axis with respect to said reflective surface, a test pattern in the focal plane of said telescope objective, a second test pattern of the same size and shape as said first mentioned pattern, a source of light illuminating said second test pattern, a semi-transparent mirror arranged between said first mentioned test pattern and said autocollimator telescope for reflecting an image of said second test pattern into the objective of said telescope so that the latter in combination with the lens to be examined projects said image onto said reflective surface, said reflective surface being adapted to reflect said image back through said lens and said telescope objective onto said test pattern in the focal plane of said telescope objective, a photo cell in the path of the light passing through said first named test pattern and adapted to be energized by light passing through said test pattern, and means for indicating the value of the electric current produced in said photo cell.

6. A device for examining and controlling the adjustment of lenses, particularly photographic objectives, as claimed in claim 3, and including light polarizing means in front of said photo cell.

7. A device for examining and controlling the adjustment of lenses, particularly photographic objectives, as claimed in claim 3, and including diaphragm means for covering selectively different zones of the lens to be examined.

8. A device for examining and controlling the adjustment of lenses, particularly photographic objectives, as claimed in claim 5, and in which said first and second test pattern are each mounted on separate plates, each being provided with a series of different test patterns, means for operatively connecting said plates with each other for simultaneous movement, and manually operable means for actuating said two plates whereby the latter may be adjusted so as to bring selectively two other but similar test patterns in operative position, namely in the focal plane of said collimator telescope and in the path of said source of light respectively.

HANS RÜHLE.
ALFRED ROELL.